United States Patent
Lier et al.

(10) Patent No.: US 9,742,522 B2
(45) Date of Patent: Aug. 22, 2017

(54) JAMMER SUPPRESSION FOR BROADCAST SATELLITE SYSTEM SERVICES

(71) Applicant: LOCKHEED MARTIN CORPORATION, Bethesda, MD (US)

(72) Inventors: Erik Lier, Newtown, PA (US); Anthony W. Jacomb-Hood, Langhorne, PA (US); Matthew George Bray, Yardley, PA (US); Russell T. Baker, Littleton, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 446 days.

(21) Appl. No.: 14/485,242

(22) Filed: Sep. 12, 2014

(65) Prior Publication Data

US 2015/0102959 A1   Apr. 16, 2015

Related U.S. Application Data

(60) Provisional application No. 61/890,838, filed on Oct. 14, 2013.

(51) Int. Cl.
*H04B 7/185* (2006.01)
*H01Q 3/00* (2006.01)
*G01S 7/36* (2006.01)
*H04K 3/00* (2006.01)

(52) U.S. Cl.
CPC ......... *H04K 3/228* (2013.01); *H04K 2203/32* (2013.01)

(58) Field of Classification Search
CPC .......................... H04B 7/2041; H01Q 25/002
USPC .............................. 342/14, 16, 154, 354, 373
See application file for complete search history.

(56) References Cited

U.S. PATENT DOCUMENTS

| | | | |
|---|---|---|---|
| 2002/0169578 A1* | 11/2002 | Yang | G01S 3/36 702/152 |
| 2007/0264929 A1 | 11/2007 | Chen | |
| 2008/0291079 A1* | 11/2008 | Chang | G01S 19/21 342/174 |
| 2014/0247186 A1* | 9/2014 | Daneshmand | G01S 19/215 342/357.59 |

FOREIGN PATENT DOCUMENTS

EP   1130675 A2   9/2001

OTHER PUBLICATIONS

Bray et al., "Optimization of Thinned Aperiodic Linear Phased Arrays Using Genetic Algorithms to Reduce Grating Lobes During Scanning," IEEE Transactions on Antennas and Propagation, Dec. 2002, vol. 50, No. 12, pp. 1732-1742.
Extended European Serach Report from European Patent Application No. 14854642.7, dated May 22, 2017.

* cited by examiner

*Primary Examiner* — Dao Phan
(74) *Attorney, Agent, or Firm* — McDermott Will & Emery LLP (57) ABSTRACT

A system for interference suppression onboard a satellite includes a beamforming module that processes radio-frequency (RF) signals originated from a plurality of antenna elements of an array antenna to generate multiple analog signals. At least one of the analog signals is an anti-interference signal. Analog-to-digital converters convert the analog signals to a number of digital signals. A processing module processes the digital signals to generate a phase and amplitude control signal. A summation module generates one or more composite signals with reduced interference.

20 Claims, 5 Drawing Sheets

JAMMER SUPPRESSION FOR BROADCAST SATELLITE SYSTEM SERVICES

CROSS-REFERENCE TO RELATED APPLICATIONS

This application claims the benefit of priority under 35 U.S.C. §119 from U.S. Provisional Patent Application 61/890,838 filed Oct. 14, 2013, which is incorporated herein by reference in its entirety.

STATEMENT REGARDING FEDERALLY SPONSORED RESEARCH OR DEVELOPMENT

Not applicable

FIELD OF THE INVENTION

The present invention generally relates to satellite communications, and more particularly, to jammer suppression for broadcast satellite system (BSS) services.

BACKGROUND

Jamming of uplink satellite antennas has become an increasing threat for disrupting satellite communication services worldwide. A jammer (e.g., a ground jammer) may use various terminals such as a large aperture terminal to transmit high power signals towards a satellite to disrupt a particular communication channel or service. Satellite communication service providers are looking for ways to counter this threat, for example, by adding anti-jamming antennas to the payload. Such systems are often expensive, have limited effectiveness, and can disrupt the satellite communication service significantly during a jamming experience.

Existing anti-jamming payloads may have added antenna elements distributed around the main antenna to create nulls towards the interferers. Reflector antennas with an active feed array or direct radiating arrays can also be used to provide low sidelobe or nulls in the direction of the interferers. The main disadvantages of the existing solutions are the cost associated with implementing these solutions and/or the limited anti-jamming capability they offer. Moreover, in these solutions, the degradation of the antenna gain-to-noise-temperature (G/T) may occur over the full frequency band of the beam rather than being limited to jammer bandwidth, as is desirable.

SUMMARY

In some aspects, a system for interference suppression onboard a satellite is described. The system includes a beamforming module that is configured to process radio-frequency (RF) signals originated from multiple antenna elements of an array antenna and to generate a number of analog signals. At least one of the analog signals is an anti-interference signal. Analog-to-digital converters convert the analog signals to multiple digital signals. A processing module is configured to process the digital signals to generate one or more composite signals that include nulls directed towards an interference source at an interference frequency.

In other aspects, a method for interference suppression onboard a satellite includes processing radio-frequency (RF) signals originated from multiple antenna elements of an array antenna to generate multiple analog signals. At least one of the analog signals is an anti-interference signal. The analog signals are converted to digital signals. The digital signals are processed to generate one or more composite signals that include nulls directed towards an interference source at an interference frequency.

In yet other aspects, a satellite system may include multiple radio-frequency (RF) paths configured to receive RF signals from multiple antenna elements of an array antenna. A beamforming module can process the RF signals to generate multiple analog signals. At least one of the analog signals is an anti-interference signal. Analog-to-digital converters convert the analog signals to digital signals. A processing module processes the digital signals to generate one or more composite signals that include nulls directed towards an interference source at an interference frequency.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to methods and configuration for interferer (also referred to as "jammer") suppression for broadcast satellite system (BSS) services. The subject technology is generally directed to high antenna gain-to-noise-temperature (G/T) (e.g., >30 dB) jammer suppression (e.g., isolation) in the coverage area with a thinned phased array with a low number of elements. In some aspects, greater than 30 dB jammer isolation can be achieved at 0.7o distance from a Ku-band uplink station and anywhere within the coverage area of a thinned phased array, for example, with a diameter of 2 meters. Increased array diameter and more elements may be used to meet a tighter jammer distance from the uplink station. Digital processing may enable 35-40 dB jammer suppression by creating a null only at the frequency of the jammer signal, without impacting uplink stations close to the jammer but operating at a different frequency than the frequency of the jammer signal.

Figure 1A:
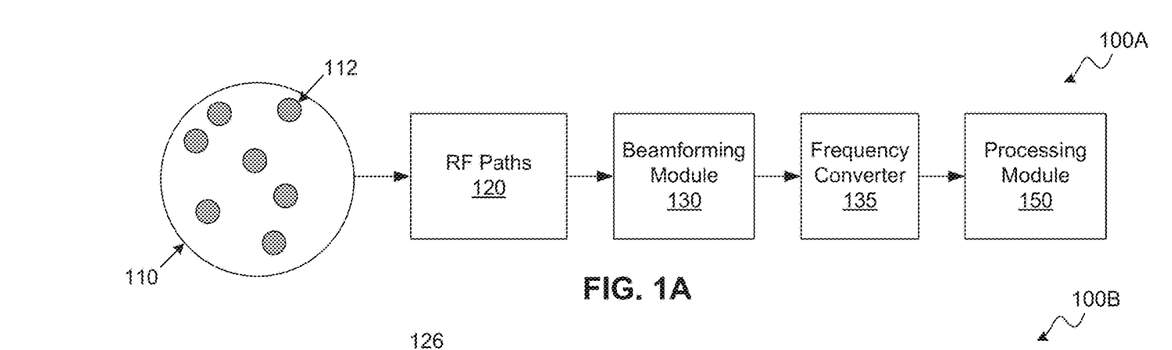
FIGS. 1A through 1C illustrate a conceptual diagram and implementation blocks of an example satellite receiver system with interference suppression, according to certain aspects.
Figure 1B:
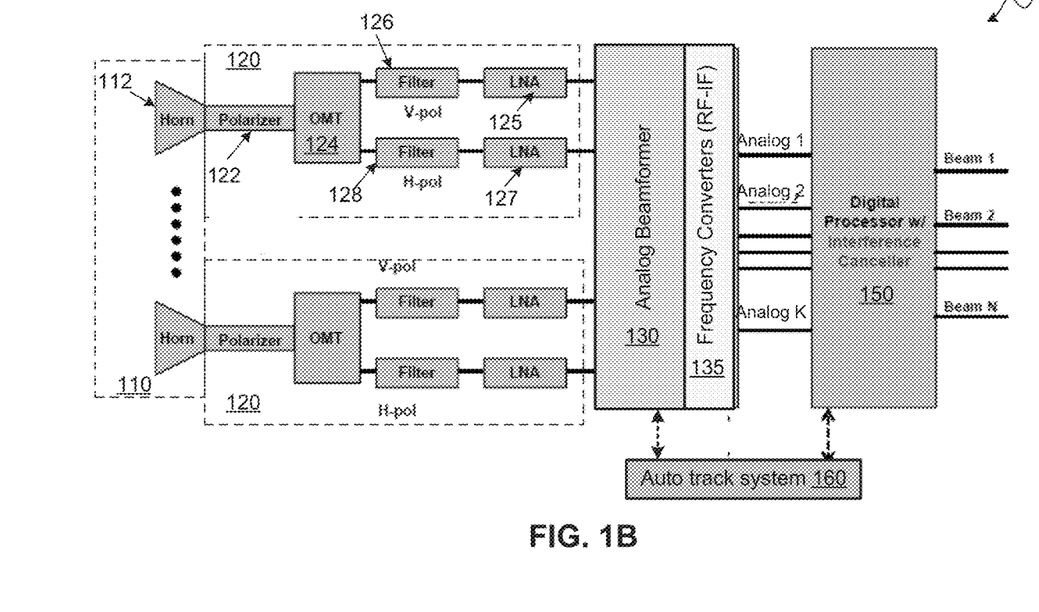
Figure 1C:
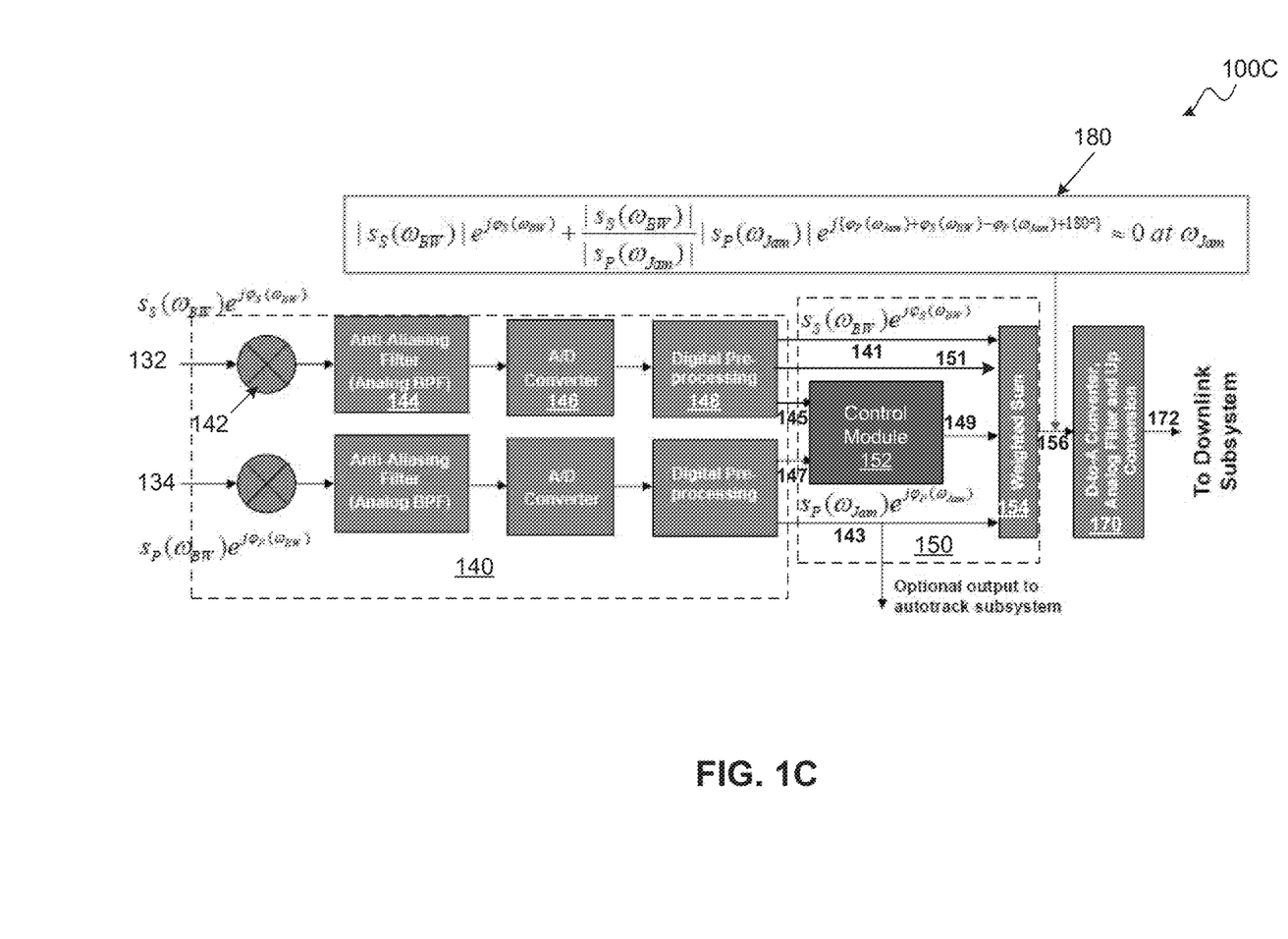

FIGS. 1A through 1C illustrate a conceptual diagram and implementation blocks of an example satellite receiver system with interference suppression, according to certain aspects of the subject technology. The example satellite receiver system 100A of FIG. 1A is onboard a satellite (e.g., a communication satellite) and can receive signals from multiple e.g., N, such as five) uplink sites e.g., desired uplink sites) and a maximum number M (e.g., one or two) of interferer sources (e.g., jammer sites). The satellite receiver system 100A includes an antenna array 110, multiple RF paths 120, a beamforming module 130, a frequency converter 135, and a processing module 150.

The antenna array 110 includes multiple (e.g., 20) antenna elements 112. The radio-frequency (RF) signals from antenna elements 112 are prepared in elemental RF paths (hereinafter "RF paths") 120 to be processed by the beamforming module 130. In some aspects, an array size (e.g., a diameter) D of the antenna array 110 may be selected that enables meeting the required minimum near-in isolation distance $\Theta$ defined, for example, as an angular distance from the uplink site to the jammer as seen from the satellite, assuming a beam shaped to generate low sidelobes. The near-in angular isolation distance is given as: $\Theta$ (degrees) ~100 $\lambda/D$, where $\lambda$ is the wavelength corresponding to the operating frequency of the antenna array.

The antenna array 110 may be designed by optimizing the aperiodic locations of the array-element configuration to generate low-level grating lobes for any beam pointing inside the desired coverage area of the scanned beams. Reduced grating lobes down to, for example, nearly 6 dB may allow for further suppression of any uplink jammer scenario by optimizing a phase and/or an amplitude of the array antenna. Each optimization can be performed with a fixed number of elements. The optimization may be repeated for arrays with various element numbers to find the optimal cost-performance solution. The array element size may be selected such that a scan loss less than approximately 2-3 dB can be achieved over the coverage area. An example array antenna element may include a corrugated horn antenna.

In some implementations, the beamforming module 130 generates a number of (e.g., K) RF analog signals, where K is the sum of the count N of the uplink sites and the maximum count M of the interferer sources. In one or more implementations, the frequency converter 135 converts the RF analog signals to intermediate frequency (IF) analog signals. In some aspects, the processing module 150 uses the IF analog signals to create one or more composite signals that include nulls directed towards an interference source at an interference frequency.

The example satellite receiver system 100B of FIG. 1B shows features of the satellite receiver system 100A in more details. For example, the antenna array 110 is shown to include a number of horn antennas as the antenna elements 112. In one or more aspects, each horn antenna 112 may be a corrugated horn antenna with improved performance including wider bandwidth and lower cross-polarization and sidelobes.

In one or more implementations, the antenna array 110 is a thinned (e.g., sparse) antenna array with a substantially lower number of antenna elements e.g., 20-30) than can fully cover the entire antenna aperture. Many conventional antenna arrays include a large number (e.g., hundreds) of antenna elements that may fill the entire antenna aperture. In other words, the thinned antenna array 110 has significantly less number of antenna elements than the existing antenna arrays. This translates into a substantial reduction in cost of the antenna array. The diameter of the antenna array is chosen to generate a small enough beamwidth to meet the minimum uplink-to-jammer distance requirement, and at the same time reduce the number of horn antennas.

In some aspects, the antenna array 110 may receive right-hand and left-hand circularly polarized orthogonal signals, and each of the RF paths 120 may be coupled to a horn antenna 112 and includes known components such as a polarizer 122, an ortho-mode transducer (OMT) 124, a first polarization receive chain including a first polarization filter 126 and a low-noise amplifier (LNA) 125, and a second polarization receive chain including a second polarization filter 128 and an LNA 127. The polarizer 122 converts the circularly polarized signals received from the horn antenna 112 to linearly polarized signals, and the OMT 124 separates the two resulting linearly polarized signals from one another. Each of the first and the second polarization signals can be filtered (e.g., using the first polarization filter 126 or the second polarization filter 128) and amplified (e.g., using the LNA 125 or the LNA 127) in the separate first and second polarization receive chains to generate signals corresponding to a frequency band (e.g., 13-14.5 GHz or 17.3-18.4 GHz). In some aspects, where the antenna array 110 receives two orthogonal linearly polarized signals, the RF paths 120 are similar and the polarizer 122 is not needed.

The beamforming module (e.g., analog beamformer) 130 uses the RF signals received from the RF paths 120 to generate K RF analog signals (e.g., beams), which after conversion to IF by the frequency converters 135 provides K IF analog signals (hereinafter "analog signals", such as Analog 1 to Analog K), where K is the sum of the count of the uplink sites (e.g., N) and the maximum count of the interferer sources (e.g., M). In other words, one beam can be formed per each uplink site and jammer site. For example, if the antenna system 100B has a ground-coverage area that includes one uplink site and one interferer source, K=2 and two analog signals (e.g., K=2) such as an uplink beam and an anti-jam beam are generated. The uplink beam mostly contains the intended signal but also contains some of the interference signal, and the anti-jam beam mostly contains interference signal but also contains some of the intended signal. In case an uplink site uses both polarizations, the analog beamformer 130 generates dual-polarized beams for that uplink site.

In some aspects, an optional auto-track system 160 can facilitate steering of the array antenna to point one or more beams (e.g., composite signals) in a desired direction and to prevent drifting of the beams from the desired direction as the satellite attitude drifts.

In some implementations, the analog beamformer 130 is a known block, for example, implemented by phase shifters and amplitude control components, and helps to reject partially the interferer signal from the beam pointed to the intended signal uplink site at an earlier stage before the digital processing module 150. This feature of the subject technology includes a number of advantages. For example, the use of the analog beamformer 130 results in lower cost by reducing the number of IF filters and analog-to-digital converters (ADCs) 130 (not shown in FIGS. 1A and 1B for simplicity) that are used following the analog beamformer. A further advantage of the use of the analog beamformer 130 is that it leaves less digital work load for the processing module (e.g., digital processor with interference canceller)

150. In some aspects, the processing module 150 uses the analog signals (e.g., Analog 1 to Analog K of FIG. 1B) to create one or more composite signals (e.g., N signals, one per intended uplink site) which correspond to one or more composite beams each including one or more nulls directed at the interferer sources. The analog beamformer 130 provides analog signals that after processing by the digital processing module 150 can enable accurate anti-jam capabilities (e.g., 25-40 dB uplink-jammer suppression). In some implementations, the interference suppression method described herein can also be implemented using a digital beamformer in place of analog beamformer 130.

FIG. 1C illustrates example implementation block 100C that include an implementation of the processing module 150. The example implementation block 100C includes example blocks that follow the analog beamformer 130 of FIG. 1B and is focused on processing of only two analog signal outputs (e.g., one channel) of the analog beamformer 130, which are shown as analog input signals 132 and 134. The analog input signals 132 and 134 may, for example, come from the uplink beam and the anti-interference beam, respectively, generated by the analog beamformer 130, for the case of one uplink site and one interferer source (e.g., jammer).

The implementation blocks 100C include a preprocessing bock 140, the processing module 150, and a digital-to-analog converter (DAC) 170. The preprocessing block 140 includes two identical chains, each including known modules such as a down-converter 142, an anti-aliasing filter 144, an A/D converter 146, and a digital pre-processing module 148. Examples of the anti-aliasing filter 144 may include an analog band-pass filter (BPF) that can prepare the analog down-converted signal (e.g., an intermediate-frequency (IF) signal) for A/D conversion. The digital pre-processing module 148 may provide additional processing of the digital signal by further down-converting the digital signal (e.g., the IF signal) to baseband, digital filtering of the received signals, and down-sampling (e.g., decimation). In some implementations, digital filtering by each digital pre-processing module 148 may be used to separate the received signal of each of the identical chains into two parts: a sub-band signal (e.g., 145 or 147) that contains interference, and a filtered sub-band signal (e.g., 151) that does not contain interference. In some aspects, a commandable or automatic amplitude control block may be implemented prior to A/D conversion of the filtered signal to adjust the amplitude of the signal according to a dynamic range of the A/D converter 146.

In some implementations, the processing module 150 includes a control module 152 and a weighted sum module 154. The control module 152 is a digital processor that can employ a computationally efficient algorithm to generate a phase and amplitude control signal 149. In some aspects, the interference cancellation processor is a cross-correlator module that can cross correlate the sub-band signals 145 and 147 that contain interference to generate phase and amplitude control signal 149. The weighted sum module 154 combines signals 141 and 143 using weights defined based on the phase and amplitude control signal 149 to form a reduced-interference composite signal. The weighted sum module 154 further combines the reduced-interference composite signal with signal 151 to form a composite signal 156. This approach protects signals coming from a ground station close to the interferer but using a signal at a different frequency than the interferer from being suppressed.

In some implementations, the control module 152 can find an amplitude ratio and a phase ratio of the signals 145 and 147 and may provide the ratios to the weighted sum module 154. The weighted sum module 154 may combine the received signals with appropriate weights to generate a reduced-interference composite signal, the mathematical form of which is shown in text box 180 and has a zero at the frequency of the interfere (e.g., $\omega_{jam}$). The digital composite signal 156 is converted, by the D/A convertor 170, to an analog composite signal 172 that is ready to be delivered to the downlink subsystem for transmission to the ground. The analog composite signal 172 may be optionally provided to the auto-track subsystem 160 of FIG. 1B.

Figure 2A:
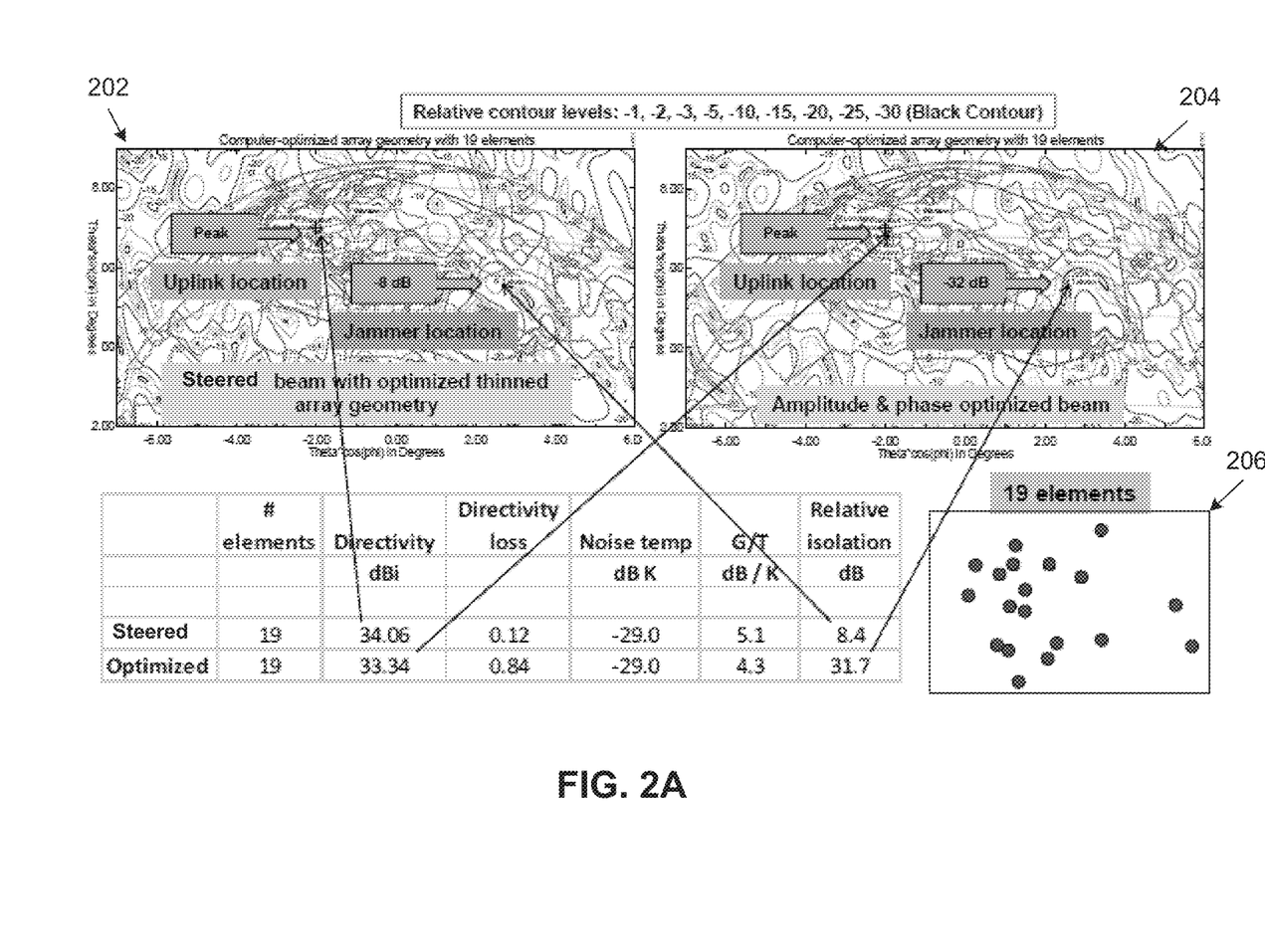
FIGS. 2A-2B are diagrams illustrating examples of simulated performance results for a satellite receiver system with interference suppression, according to certain aspects.

FIGS. 2A-2B are diagrams illustrating examples of simulated performance results for a satellite receiver system with interference suppression of FIGS. 1A-through 1C, according to certain aspects of the subject technology. Contour diagrams 202 and 204 of FIG. 2A show maps of directivity for a scanned beam with optimized thinned array including 19 antenna elements arranged, for example, in the optimized configuration 206. The X and Y axes of the maps represent the azimuth and elevation coordinates. The contour diagram 204 shows improved results after formation of the composite signal 156 in the weighted sum module 154 of FIG. 1C. The results shown in the contour diagram 202 indicate the beam pattern of the beam directed towards the intended uplink site at the output of the analog beamformer. It can be seen that all grating lobes in this pattern are suppressed by the aperiodic location of the antenna elements by at least 6 to 8 dB. In order to show a worst case example, it is assumed that the jammer is located at the peak of one of these grating lobes. In this example, the jammer is suppressed by 8 dB compared to at the uplink location. After application of the weighted summation (contour map 204), the suppression of the interferer (e.g., relative isolation) drastically increases to ~32 dB.

Figure 2B:
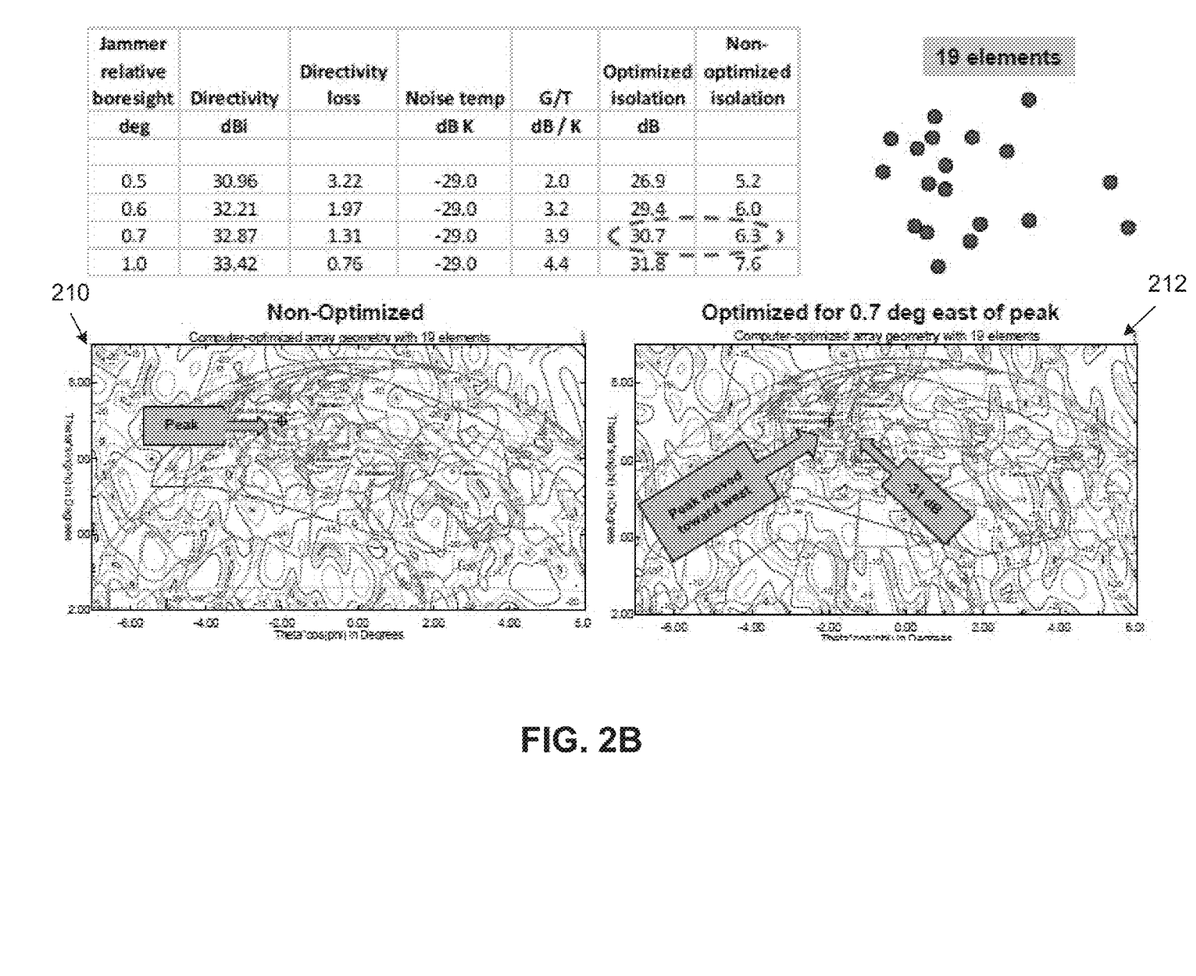

The results shown in the contour maps 210 and 212 of FIG. 2B show that near-in jammers can be suppressed (e.g., by ~31 dB), by the satellite receiver system of FIGS. 11A-through 1C with a 19-element array antenna, even if the isolation level before application of the weighted summation is only ~6 dB.

Figure 3:
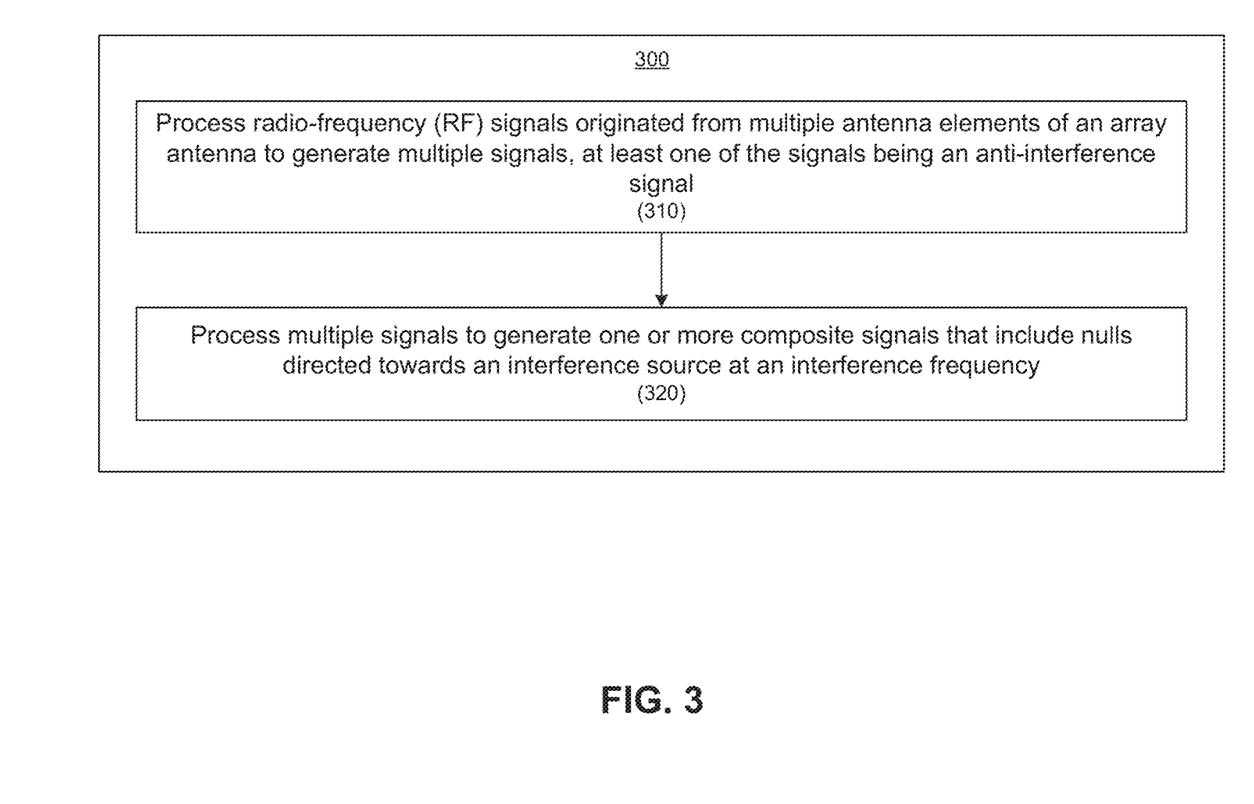
FIG. 3 is a flow diagram illustrating an example of a method for interference suppression onboard a satellite, according to certain aspects.

FIG. 3 is a flow diagram illustrating an example of a method 300 for interference suppression onboard a satellite, according to certain aspects of the subject technology. The method 300 includes processing (e.g., by 130 of FIG. 1A) radio-frequency (RF) signals originated from multiple antenna elements (e.g., 112 of FIG. 1A) of an array antenna (e.g., 110 of FIG. 1A) to generate multiple signals (e.g., Analog 1 to Analog K of FIG. 1B) (310). At least one of the analog signals is an anti-interference signal (e.g., 134 of FIG. 1C). The signals are processed to generate one or more composite signals associated with a composite beam (e.g., 156 of FIG. 1C) that includes a null directed towards an interference source at an interference frequency (320).

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A system for interference suppression onboard a satellite, the system comprising:
    a thinned array antenna including a plurality of antenna elements arranged in an aperiodic configuration;
    a beamforming module configured to process radio-frequency (RF) signals originated from the plurality of antenna elements of the thinned array antenna and to generate a plurality of signals, at least one of the plurality of signals being an anti-interference signal; and
    a processing module configured to process the plurality of signals to generate one or more composite signals associated with a composite beam that include a null associated with an interferer source.

2. The system of claim 1, wherein the plurality of signals comprise a plurality of analog signals, wherein the system further comprises a plurality of analog-to-digital converters configured to convert the plurality of analog signals to a plurality of digital signals, and wherein the null is directed to the interferer source at an interference frequency.

3. The system of claim 1, wherein a count of the plurality of antenna elements of the thinned array antenna is less than a full-aperture count of antenna elements that nearly covers an entire aperture of the thinned array antenna.

4. The system of claim 3, wherein an optimized configuration comprises a quasi-randomized configuration, and wherein the optimized configuration generates low-level grating lobes inside a coverage area.

5. The system of claim 1, wherein at least one of the RF signals comprises an anti-interference signal received from the interferer source, and a remaining of the RF signals correspond to multiple intended uplink sites, wherein at least one of the plurality of signals comprises an interference signal, and wherein a count of the plurality of signals comprises a sum of a count of the multiple intended uplink sites and a count of one or more interferer sources.

6. The system of claim 1, wherein the RF signals are received from a plurality of elemental RF paths, wherein at least some of the plurality of elemental RF paths are configured to separate orthogonal polarization components of signals received from at least some of the plurality of antenna elements.

7. The system of claim 1, wherein the processing module comprises a control module and a summation module, wherein the control module is configured to employ a computationally efficient algorithm to generate a phase and amplitude control signal, and wherein the control module comprises a cross-correlator module that is configured to cross correlate at least some of the plurality of signals to generate the phase and amplitude control signal.

8. The system of claim 7, wherein the summation module is configured to generate the one or more composite signals based on the plurality of signals and one or more phase and amplitude control signals, wherein the one or more composite signals do not impact an uplink site that operates at a different frequency than an interference frequency, and wherein the system is further configured to receive information regarding the interference frequency of the interferer source from a ground station.

9. The system of claim 1, further comprising a digital-to-analog converter (DAC) configured to convert the one or more composite signals to one or more analog output signals, and a downlink subsystem configured to transmit the one or more analog output signals down to the ground.

10. A method for interference suppression onboard a satellite, the method comprising:
    providing a thinned array antenna including a plurality of antenna elements arranged in an aperiodic configuration;
    processing radio-frequency (RF) signals originated from the plurality of antenna elements of the thinned array antenna to generate a plurality of signals, at least one of the plurality of signals being an anti-interference signal; and
    processing the plurality of signals to generate one or more composite signals associated with a composite beam that includes a null associated with an interferer source.

11. The method of claim 10, wherein the plurality of signals comprise a plurality of analog signals, and the method further comprises converting the plurality of analog signals to a plurality of digital signals, and wherein the null is directed to the interferer source at an interference frequency.

12. The method of claim 10, wherein a count of the plurality of antenna elements of the thinned array antenna is less than a full-aperture count of antenna elements that nearly covers an entire aperture of the thinned array antenna.

13. The method of claim 12, further comprising arranging the plurality of antenna elements of the thinned array antenna to generate low-level grating lobes inside a coverage area, and wherein an optimized configuration comprises a quasi-randomized configuration.

14. The method of claim 10, further comprising receiving at least one of the RF signals from the interferer source and a remaining of the RF signals from multiple intended uplink sites, wherein at least one of the plurality of signals comprises an interference signal, and wherein the count of the plurality of signals comprises a sum of a count of the multiple intended uplink sites and a count of one or more interferer sources.

15. The method of claim 14, further comprising processing the received RF signals in a plurality of elemental RF paths, wherein at least some of the plurality of elemental RF paths are configured to separate orthogonal polarization components of the received RF signals.

16. The method of claim 10, wherein processing the plurality of signals comprises employing a computationally efficient algorithm to generate one or more phase and amplitude control signals, and wherein processing the plurality of signals comprises cross correlating at least some of the plurality of signals to generate the phase and amplitude control signal.

17. The method of claim 16, wherein generating the one or more composite signals comprises generating the one or more composite signals based on the plurality of signals and the one or more phase and amplitude control signals, wherein the one or more composite signals do not impact an uplink site that operates at a different frequency than an interference frequency and is located in close proximity to the interferer source, and the method further comprises receiving information regarding the interference frequency from a ground station.

18. The method of claim 10, further comprising converting the one or more composite signals to analog output signals, and directing the analog output signals via a beam of a transmitter to the ground.

19. A satellite system, comprising:
a plurality of radio-frequency (RF) paths configured to receive RF signals from a plurality of antenna elements of a thinned array antenna arranged in a aperiodic configuration;
a beamforming module configured to process the RF signals and to generate a plurality of signals, at least one of the plurality of signals being an anti-interference signal; and
a processing module configured to process the plurality of signals to generate one or more composite signals associated with a composite beam that includes a null associated with an interferer source.

20. The satellite system of claim 19, wherein:
the plurality of signals comprise a plurality of analog signals, and the method further comprises converting the plurality of analog signals to a plurality of digital signals, and wherein the null is directed to the interferer source at an interference frequency, wherein the processing module comprises a control module and a summation module, wherein the control module is configured to employ a computationally efficient algorithm to generate a phase and amplitude control signal, wherein the control module comprises a cross-correlator module, wherein the cross-correlator module comprises a digital cross-correlator and is configured to perform the cross-correlation by comparing at least some of the plurality of digital signals to generate the phase and amplitude control signal, and wherein the summation module is configured to generate the one or more composite signals based on the plurality of digital signals and the phase and amplitude control signal.

* * * * *